United States Patent
Hapsari et al.

(10) Patent No.: US 8,577,282 B2
(45) Date of Patent: Nov. 5, 2013

(54) METHOD FOR REPORTING MULTI-ADDRESS INFORMATION, MOBILE STATION AND AUTHENTICATION ORGANIZATION SYSTEM

(75) Inventors: Wuri Andarmawanti Hapsari, Yokosuka (JP); Itsuma Tanaka, Yokohama (JP); Minami Ishii, Yokohama (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 401 days.

(21) Appl. No.: 12/937,099

(22) PCT Filed: Apr. 9, 2009

(86) PCT No.: PCT/JP2009/057253
§ 371 (c)(1),
(2), (4) Date: Dec. 22, 2010

(87) PCT Pub. No.: WO2009/125813
PCT Pub. Date: Oct. 15, 2009

(65) Prior Publication Data
US 2011/0111787 A1    May 12, 2011

(30) Foreign Application Priority Data
Apr. 9, 2008 (JP) ................................ 2008-101989

(51) Int. Cl.
*H04H 20/74* (2008.01)

(52) U.S. Cl.
USPC ........ 455/3.02; 455/3.01; 455/3.03; 455/410; 455/411; 455/403; 725/62; 725/63; 725/65; 725/66; 725/67; 370/310; 370/328; 370/338

(58) Field of Classification Search
USPC ............ 455/3.01–3.06, 410, 411, 456.1–457, 455/500, 517, 404.1, 404.2, 414.1–414.4, 455/422.1, 403, 550.1, 502, 509, 426.1, 455/426.2, 412.1, 412.2; 370/310, 328, 370/338, 343; 725/62, 63, 65, 66, 67, 68
See application file for complete search history.

(56) References Cited

U.S. PATENT DOCUMENTS 5,414,432 A * 5/1995 Penny et al. ............. 342/357.59
2008/0122695 A1 * 5/2008 Wang et al. .................. 342/451

FOREIGN PATENT DOCUMENTS

CN          1384690 A     12/2002
JP       2004-312578 A    11/2004

OTHER PUBLICATIONS

International Search Report w/translation from PCT/JP2009/057253 dated Jun. 16, 2009 (2 pages).

(Continued)

Primary Examiner — Keith Ferguson
(74) Attorney, Agent, or Firm — Osha Liang LLP

(57) ABSTRACT

A method for reporting multi-address information comprises a step wherein each of mobile stations (UE) obtains the positional information relating to the mobile stations (UE) and manages information relating to the obtained positional information, a step for reporting multi-address information provided with an electronic signature to each of the mobile stations (UE), a step wherein each of the mobile stations (UE) verifies the multi-address information by use of the electronic signature provided to the received multi-address information, a step wherein each of the mobile stations (UE), when the verifying is successful, compares positional information contained in the multi-address information with the positional information being managed, and a step wherein each of the mobile stations (UE) performs processing in response to the multi-address information on the basis of the result of comparing.

9 Claims, 4 Drawing Sheets

(56) References Cited

OTHER PUBLICATIONS

3GPP TS 22.168 V8.0.0; "3rd Generation Partnership Project; Technical Specification Group Services and System Aspects; Earthquake and Tsunami Warning System (ETWS) requirements; Stage 1 (Release 8)"; Mar. 2008 (12 pages).

3GPP TSG RAN WG Meeting #59bis, R3-080844; "Reply LS to SA2 regarding ETWS Security"; Shenzen, China; Mar. 31-Apr. 3, 2008 (2 pages).

Office Action for Japanese Patent Application No. 2008-101989 mailed Aug. 7, 2012, with English translation thereof (4 pages).

Office Action for Chinese Patent Application No. 200980112580.0 issued Oct. 31, 2012, with English translation thereof (12 pages).

Espacenet, Patent Abstract for Chinese Publication No. 1384690 published Dec. 11, 2002 (1 page).

Office Action for Japanese Patent Application No. 2008-101989 mailed Apr. 24, 2012, with English translation thereof (4 pages).

Office Action issued in corresponding Chinese Application No. 200980112580.0 mailed May 15, 2013 (13 pages).

* cited by examiner

METHOD FOR REPORTING MULTI-ADDRESS INFORMATION, MOBILE STATION AND AUTHENTICATION ORGANIZATION SYSTEM

TECHNICAL FIELD

The present invention relates to a broadcast information reporting method for reporting broadcast information to mobile stations, and also relates to a mobile station and a certificate authority system.

BACKGROUND ART

In 3GPP, studies are being made on "ETWS (earthquake and tsunami warning system)" for distributing emergency information such as information on earthquakes, tsunamis and the like.

As shown in FIG. 1, in "ETWS," a certificate authority system 2 is configured to attach an electronic signature to emergency information received from an emergency information provider system 1, and to report the emergency information by a CBS (cell broadcast service) message or the like to cells included in the area where the earthquake or the like has occurred.

However, the above-mentioned "ETWS" has a problem that it is difficult to prevent a "forwarding attack" in which a malicious third party forwards emergency information received in the area where the earthquake or the like has occurred, to a mobile station in a different area (area where no earthquake or the like has occurred) to cause confusion.

SUMMARY OF THE INVENTION

Hence, the present invention has been made in view of the above problem, and aims to provide a broadcast information reporting method, a mobile station and a certificate authority system which are capable of preventing a "forwarding attack."

A first aspect of the present invention is summarized as a broadcast information reporting method for reporting broadcast information to each of a plurality of mobile stations, the method comprise step A of acquiring, by the each of the plurality of mobile stations, location information of the mobile station and managing information related to the acquired location information, step B of reporting, to the each of the plurality of mobile stations, broadcast information to which an electronic signature is attached, step C of verifying, by the each of the plurality of mobile stations, the broadcast information by use of the electronic signature attached to the received broadcast information, step D of when the broadcast information is successfully verified, comparing, by the each of the plurality of mobile stations, location information included in the broadcast information and the location information managed in the mobile station and step E of performing, by the each of the plurality of mobile stations, processing corresponding to the broadcast information depending on the comparison result.

In the first aspect, wherein in the step A, the each of the plurality of mobile stations manages first time information indicating a time when the location information of the mobile station is acquired, in the step D, the each of the plurality of mobile stations compares the first time information managed therein and second time information included in the broadcast information and in the step E, the each of the plurality of mobile stations performs processing corresponding to the broadcast information depending on the comparison results on the location information and the time information.

In the first aspect, wherein the location information included in the broadcast information contains a plurality of pieces of area identification information and in the step E, the each of the plurality of mobile stations performs processing corresponding to the broadcast information when the location information managed in the mobile station coincides with at least one of the pieces of area identification information contained in the location information included in the broadcast information.

In the first aspect, wherein the plurality of pieces of area identification information are information identifying areas around an area for which a content of the broadcast information is valid.

In the first aspect, wherein in the step A, the mobile station receives security information corresponding to the location information from a network and manages the security information and in the step C, the each of the plurality of mobile stations verifies the broadcast information by use of the security information and the electronic signature attached to the broadcast information.

In the first aspect, wherein in the step E, the each of the plurality of mobile stations performs processing corresponding to the broadcast information when, as a result of comparison on the time information, it is determined that the second time information is within a predetermined window time of a current time information managed in the mobile station.

In the first aspect, wherein in the step E, the each of the plurality of mobile stations performs processing corresponding to the broadcast information when, as a result of comparison on the time information, it is determined that the second time information indicates a later time than the first time information.

A second aspect of the present invention is summarized as a mobile station which performs processing corresponding to broadcast information, comprise a manager configured to acquire location information of the mobile station and to manage information related to the acquired location information a verifier unit configured to verify the broadcast information by use of an electronic signature attached to the received broadcast information, a comparison unit configured to, when the broadcast information is successfully verified, compare location information included in the broadcast information and the location information managed therein and a processor configured to perform processing corresponding to the broadcast information depending on the comparison result.

In the second aspect, wherein the manager is configured to manage first time information indicating a time when the location information of the mobile station is acquired, the comparison unit is configured to compare the first time information managed therein and second time information included in the broadcast information and the processor is configured to perform processing corresponding to the broadcast information depending on the comparison results on the location information and the time information.

In the second aspect, wherein the location information included in the broadcast information contains a plurality of pieces of area identification information and the processor is configured to perform processing corresponding to the broadcast information when the location information managed therein coincides with at least one of the pieces of area identification information contained in the location information included in the broadcast information.

In the second aspect, wherein the plurality of pieces of area identification information are information identifying areas around an area for which a content of the broadcast information is valid.

In the second aspect, wherein the manager is configured to receive security information corresponding to the location information from a network and to manage the security information and the verifier unit is configured to verify the broadcast information by use of the security information and an electronic signature attached to the broadcast information.

In the second aspect, wherein the processor is configured to perform processing corresponding to the broadcast information when, as a result of comparison on the time information, it is determined that the second time information is within a predetermined window time of a current time information managed in the mobile station.

In the second aspect, wherein the processor is configured to perform processing corresponding to the broadcast information when, as a result of comparison on the time information, it is determined that the second time information indicates a later time than the first time information.

A second aspect of the present invention is summarized as a certificate authority system which reports broadcast information to a mobile station in a mobile communication system, the system comprising an emergency information transmitter unit configured to convert location information included in broadcast information received from an emergency information provider system into area identification information in the mobile communication system, then add, as location information in the broadcast information, area identification information identifying areas around the area identified by the converted area identification information, thereafter assign the broadcast information an electronic signature corresponding to the broadcast information, and report the broadcast information to the mobile station.

EMBODIMENT MODE FOR CARRYING OUT THE INVENTION (Configuration of Mobile Communication System according to First Embodiment of Present Invention)

Figure 1:
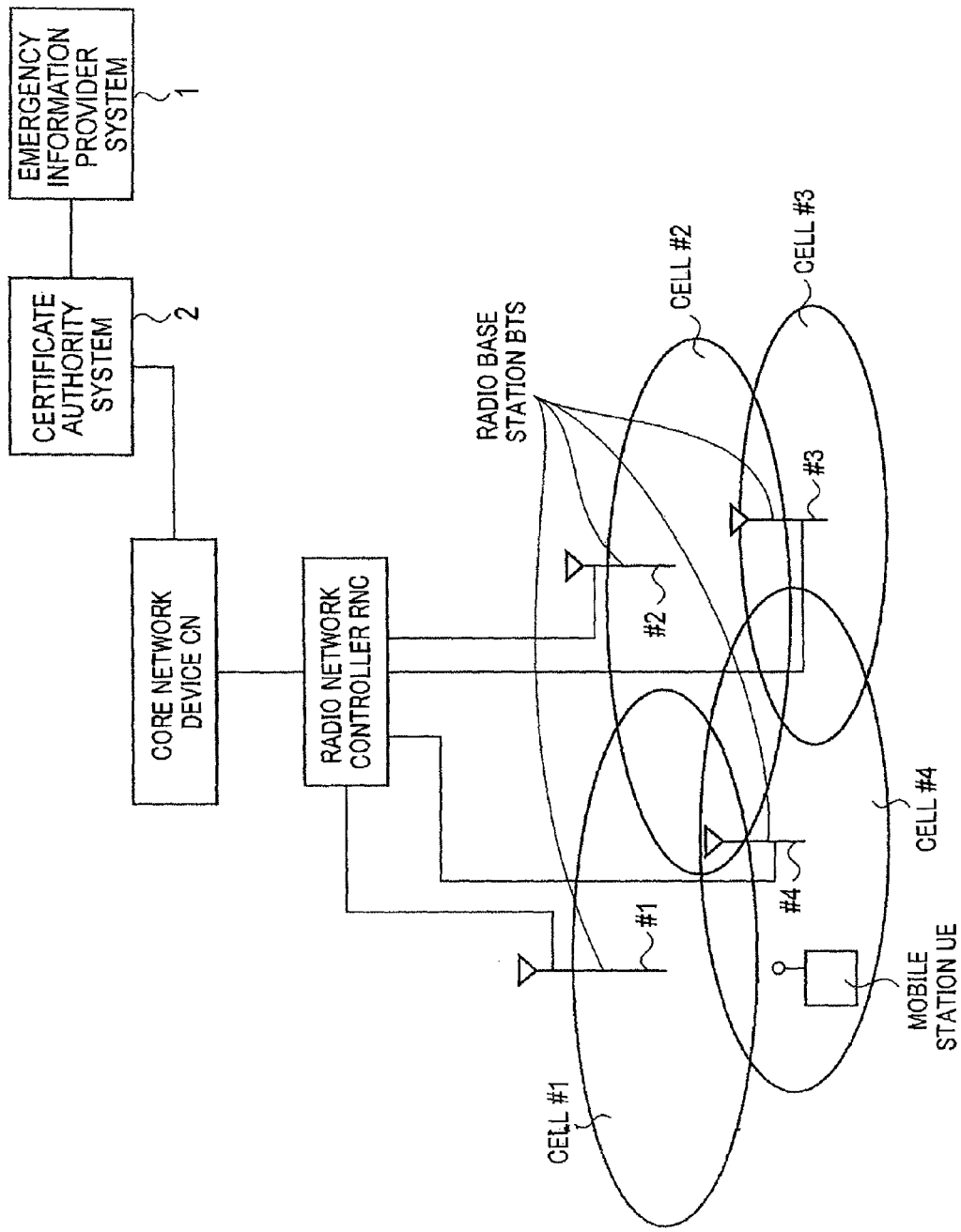
FIG. 1 is an overall configuration diagram of a mobile communication system according to a first embodiment of the present invention.
Figure 2:
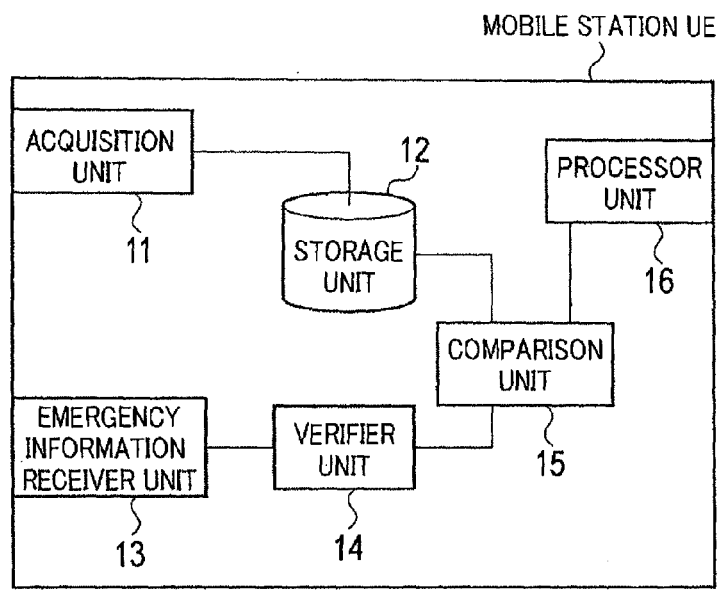
FIG. 2 is a functional block diagram of a mobile station according to the first embodiment of the present invention.
Figure 3:
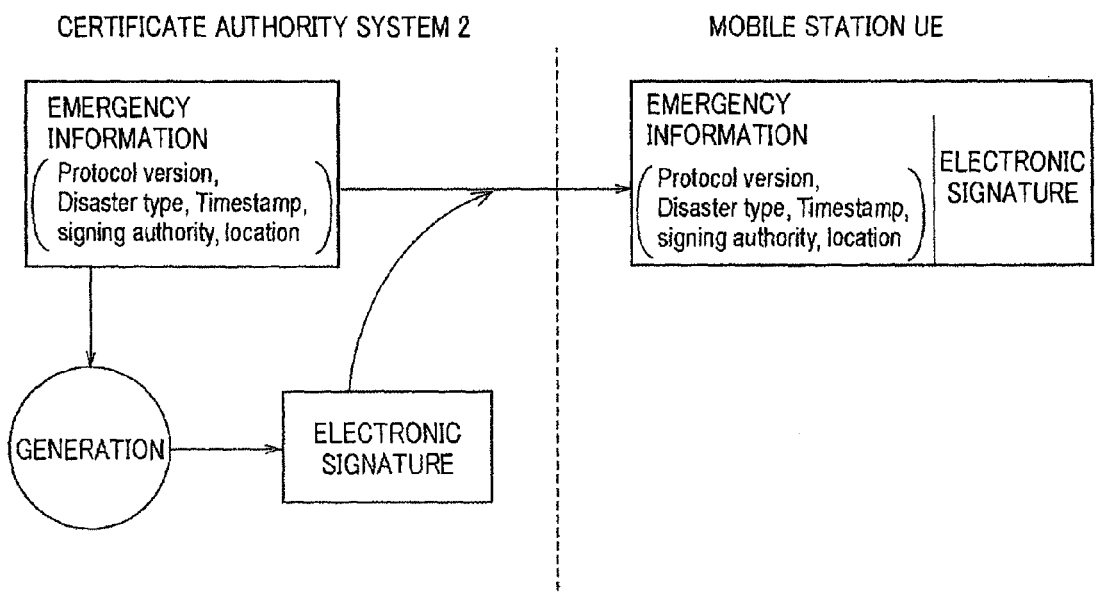
FIG. 3 is a diagram showing an example of emergency information transmitted in the mobile communication system according to the first embodiment of the present invention.

With reference to FIGS. 1 to 3, a description will be given of a configuration of a mobile communication system according to a first embodiment of the present invention.

"ETWS" is applied to the mobile communication system of this embodiment, and a certificate authority (Signing Authority) system 2 is configured to attach an electronic signature to emergency information (Primary Notification) transmitted from an emergency information provider (Notification Provider) system 1, and to report the emergency information by a CBS (cell broadcast service) message or the like to cells (such as cells #1 to #4) included in the area where the earthquake or the like has occurred, through a core network device CN, a radio network controller RNC, a radio base station BTS and the like.

Specifically, as shown in FIG. 1, the mobile communication system according to this embodiment includes the emergency information provider system 1, the certificate authority system 2, the core network device CN, the radio network controller RNC and the radio base station BTS.

As shown in FIG. 2, a mobile station UE of this embodiment includes an acquisition unit 11, a storage 12, an emergency information receiver 13, a verifier 14, a comparison unit 15 and a processor 16.

The acquisition unit 11 is configured to acquire location information of the mobile station UE at a certain timing.

For example, the acquisition unit 11 may be configured to acquire, as location information of the mobile station UE, a cell ID of a cell in which the mobile station UE is currently present, a location registration area ID of the mobile station UE or GPS information (latitude and longitude information).

The storage 12 is configured to manage location information of the mobile station UE acquired by the acquisition unit 11. Here, the storage 12 may be configured to manage not only the current location information of the mobile station UE acquired by the acquisition unit 11, but also location information of the mobile station UE acquired by the acquisition unit 11 a predetermined time ago.

In addition, the storage 12 is configured to manage first time information indicating the time when the location information of the mobile station UE is acquired by the acquisition unit 11. Further, the storage 12 may be configured to manage not only the first time information indicating the acquisition time of the current location information of the mobile station UE, but also information indicating the acquisition time of location information of the mobile station UE acquired a predetermined time ago.

Moreover, the storage 12 may be configured to receive security information (such as a Shared Secret or a public key of the certificate authority system 2) corresponding to the location information from a network and manage the information. Here, a different value may be used for the Shared Secret for each piece of location information.

The emergency information receiver 13 is configured to receive emergency information (broadcast information) reported by the certificate authority system 2.

For example, the emergency information receiver 13 is configured to receive emergency information (Primary Notification) included in a CBS message, a paging message or the like.

Here, as shown in FIG. 3, such emergency information includes a "protocol version (Protocol Version)," a "disaster type (Disaster Type)," later-described "second time information (Timestamp)," an "identification of a certificate authority system (certificate authority) (Signing Authority)" and "location information (Location)." Additionally, as shown in FIG. 3, an electronic signature corresponding to the emergency information is attached to the emergency information. Such an electronic signature is generated by the certificate authority system 2 by use of a private key of the certificate authority system 2.

Note that although this embodiment uses as broadcast information emergency information reported in the ETWS, other broadcast information may be used instead.

The verifier 14 is configured to verify emergency information by use of the electronic signature (Signature) attached to the emergency information received by the emergency information receiver 13.

Here, the verifier 14 may be configured to verify the emergency information by use of security information managed by the storage 12.

Figure 4:
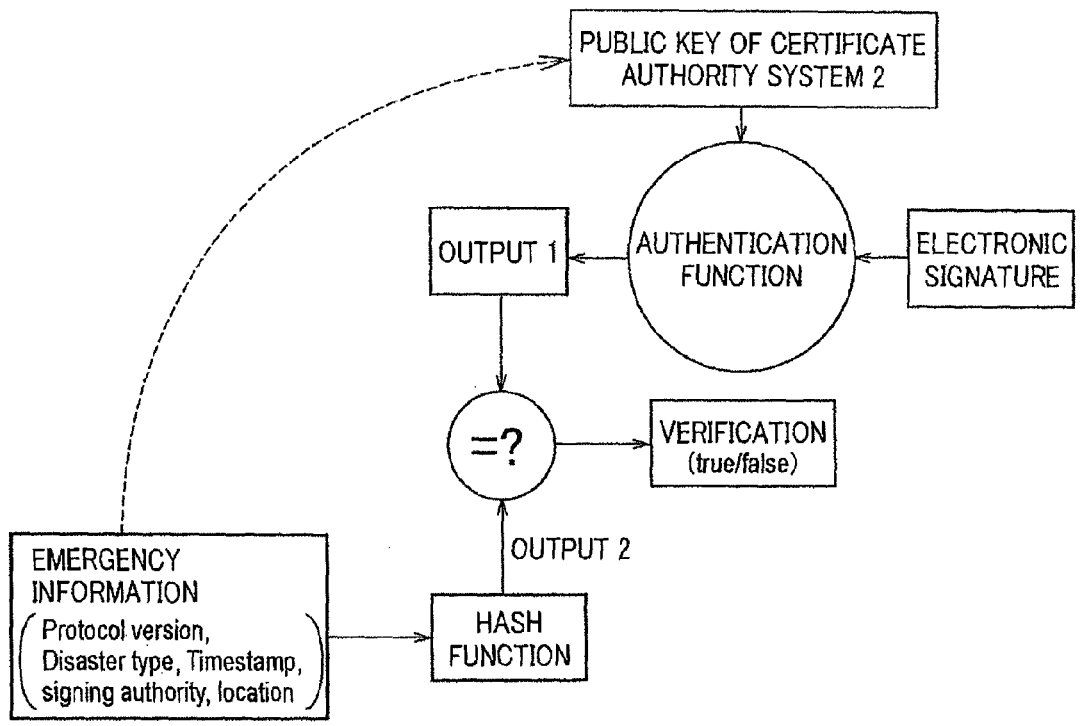
FIG. 4 is a diagram for describing an operation of a verifier in a mobile station according to the first embodiment of the present invention.

Otherwise, the verifier 14 may be configured to verify the emergency information by a method shown in FIG. 4, for example.

Firstly, the verifier 14 inputs, to an authentication function, security information (a public key of the certificate authority system 2) managed by the storage 12 and an electronic signature attached to the emergency information (Primary Notification) to thereby obtain an output 1, the emergency information being acquired by the acquisition unit 11.

Secondly, the verifier 14 inputs the emergency information (Primary Notification) acquired by the acquisition unit 11 to a hash function to obtain an output 2.

Thirdly, the verifier 14 determines whether or not the output 1 and output 2 coincide with each other, and if so, determines that the emergency information is verified.

Further, the verifier 14 may determine that the emergency information (Primary Notification) is successfully verified when the security information (Shared Secret) managed by the storage 12 coincides with the Shared Secret included in the emergency information (Primary Notification).

The comparison unit 15 is configured to, when the emergency information is successfully verified by the verifier 14, compare location information (Location) included in the emergency information received by the emergency information receiver 13 with location information of the mobile station UE managed by the storage 12.

For example, the comparison unit 15 may be configured to determine whether or not location information of the mobile station UE managed by the storage 12 coincides with at least one of pieces of area identification information contained in the location information included in the emergency information, which is received by the emergency information receiver 13.

Here, the area identification information contained in the location information included in the emergency information may be information for identifying areas around the area for which the emergency information is valid.

In addition, the comparison unit 15 is configured to compare first time information managed by the storage 12 and second time information (Time) included in the emergency information received by the emergency information receiver 13.

For example, the comparison unit 15 may be configured to determine which of the time specified by the first time information managed by the storage 12 or the time specified by the second time information contained in the location information included in the emergency information indicates an earlier time (or later time), the emergency information being received by the emergency information receiver 13.

The processor 16 is configured to perform processing according to the emergency information received by the emergency information receiver 13, depending on results of location information comparison and time information comparison made by the comparison unit 15.

To be specific, the processor 16 is configured to perform processing (such as setting off a buzzer or an alarm, or displaying on a screen) according to the emergency information, when it is determined that the current location information of the mobile station UE managed by the storage 12 coincides with at least one of multiple pieces of area identification information (cell ID, location registration area ID, latitude and longitude information and the like) contained in the location information included in the emergency information, which is received by the emergency information receiver 13.

In addition, the processor 16 is configured to perform processing (such as setting off a buzzer or an alarm, or displaying on a screen) according to the emergency information, when the time specified by the first time information managed by the storage 12 is earlier than the time specified by the second time information contained in the location information included in the emergency information, which is received by the emergency information receiver 13.

In other words, the processor 16 may be configured to perform processing according to the emergency information when, as a result of time information comparison, it is determined that the second time information indicates a later time than the first time information.

Moreover, the processor 16 may be configured to perform processing according to the emergency information when, as a result of time information comparison, it is determined that the second time information is within a predetermined window time of the current time information managed by the mobile station UE.

Figure 5:
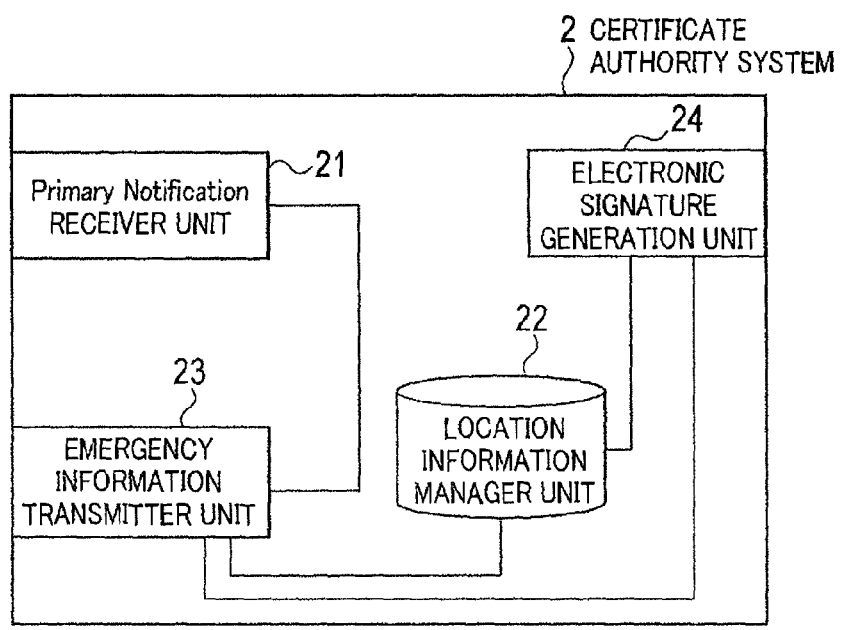
FIG. 5 is a functional block diagram of a certificate authority system according to the first embodiment of the present invention.

As shown in FIG. 5, the certificate authority system 2 of this embodiment includes a primary notification receiver 21, a location information manager 22, an emergency information transmitter 23 and an electronic signature generation unit 24.

The primary notification receiver 21 is configured to receive emergency information (Primary Notification) from the emergency information provider system 1.

The location information manager 22 is configured to manage pieces of area identification information for identifying areas around each area identified by the area identification information in the mobile communication system.

The electronic signature generation unit 24 is configured to generate an electronic signature by use of the emergency information (Primary Notification), area identification information on each area managed by the location information manager 22 and time information for generating the electronic signature.

The emergency information transmitter 23 is configured to convert location information included in the emergency information (Primary Notification) received by the primary notification receiver 21 into area identification information (such as a cell ID, a location registration area ID or latitude and longitude information) in the mobile communication system.

In addition, the emergency information transmitter 23 is configured to add, to the emergency information, area identification information (such as a cell ID, a location registration area ID or latitude and longitude information) identifying areas around the area identified by the converted area identification information.

Thereafter, the emergency information transmitter 23 is configured to assign the emergency information the electronic signature corresponding to the emergency information, and to report the emergency information to the mobile station UE.

(Operation of Mobile Communication System according to First Embodiment of Present Invention)

Figure 6:
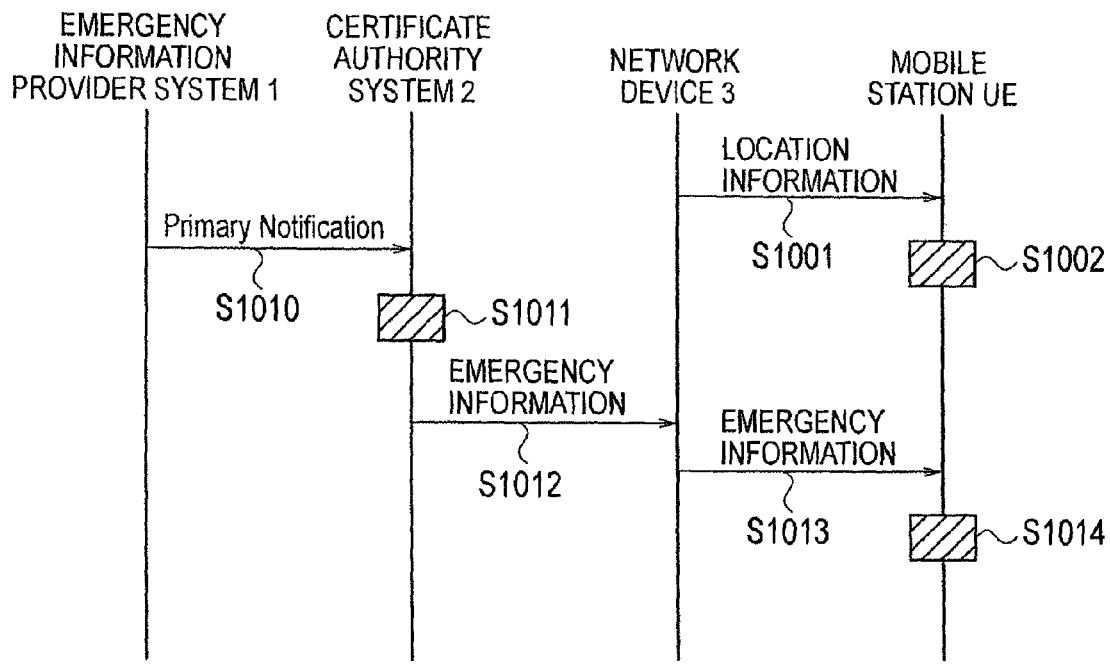
FIG. 6 is a sequence diagram showing an operation of the mobile communication system according to the first embodiment of the present invention.
Figure 7:
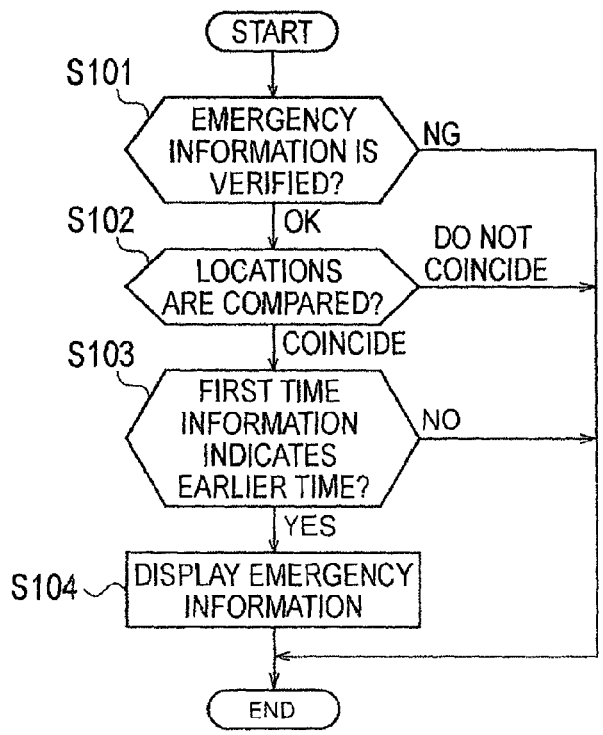
FIG. 7 is a flowchart showing an operation of the mobile station according to a second embodiment of the present invention.

With reference to FIGS. 6 and 7, a description will be given of an operation of the mobile communication system according to the first embodiment of the present invention.

As shown in FIG. 6, in step S1001, a network device 3 (radio base station BTS, radio network controller RNC, core network device CN, GPS system or the like) transmits location information of the mobile station UE to the mobile station UE.

In step S1002, the mobile station UE acquires the location information of the mobile station UE and manages the location information information.

In step S1010, the emergency information provider system (broadcast information provider system) 1 notifies the certificate authority system 2 of the emergency information (Primary Notification).

In step S1011, the emergency information provider system 1 converts the location information included in the received emergency information into area identification information (such as a cell ID, a location registration area ID or latitude and longitude information) in the mobile communication system.

Then, the emergency information provider system 1 adds, to the emergency information, area identification information (such as a cell ID, a location registration area ID or latitude and longitude information) identifying areas around the area identified by the converted area identification information.

Subsequently, in steps S1012 and S1013, the emergency information provider system 1 attaches an electronic signature to the emergency information, and reports the emergency information to the mobile station UE via the network device 3.

In step S1014, the mobile station UE having received the emergency information carries out the following operation shown in FIG. 7.

As shown in FIG., in step S101, the mobile station UE verifies the emergency information by use of the electronic signature (Signature) attached to the received emergency information.

If the emergency information is not verified, the mobile station UE does not perform processing corresponding to the emergency information.

In contrast, if the emergency information is successfully verified, in step S102, the mobile station UE compares location information included in the received emergency information and location information of the mobile station UE managed therein.

For example, the mobile station UE determines whether or not the location information of the mobile station UE managed therein coincides with at least one of the pieces of area identification information contained in the location information (Location) included in the received emergency information.

If the pieces of information do not coincide with each other, the mobile station UE does not perform processing corresponding to the emergency information.

Meanwhile, if the pieces of information coincide with each other, in step S103, the mobile station UE compares the first time information managed therein with the second time information (Time) included in the received emergency information.

For example, the mobile station UE determines which of the time specified by the first time information managed therein, or the time specified by the second time information contained in the location information included in the received emergency information indicates an earlier time (or later time).

If it is determined that the first time information indicates a later time, the mobile station UE does not perform processing corresponding to the emergency information.

In contrast, if it is determined in step S104 that the first time information indicates an earlier time, the mobile station UE performs processing corresponding to the emergency information.

(Advantageous Effects of Mobile Communication System according to First Embodiment of Present Invention)

According to the mobile communication system of the first embodiment, the mobile station UE performs processing corresponding to emergency information only when location information of the mobile station UE managed therein and location information contained in the successfully-verified emergency information coincide with each other. Specifically, a mobile station UE in an area where no earthquake or the like has occurred does not perform processing corresponding to emergency information in another area transferred by a malicious third party, and thus a "forwarding attack" can be prevented.

Additionally, according to the mobile communication system of the first embodiment of the present invention, the mobile station UE performs processing corresponding to emergency information only when first time information managed therein indicates an earlier time than the second time information included in the successfully-verified emergency information. Specifically, even when a malicious third party transmits, after occurrence of an earthquake or the like, current location information of a fake mobile station UE to a mobile station UE in an area where no earthquake or the like has occurred, the mobile station UE does not perform processing corresponding to emergency information in another area transferred by the malicious third party, and thus a "forwarding attack" can be prevented even more securely.

Modified Example

Although the above embodiment has been described by citing a W-CDMA type mobile communication system as an example, the present invention is not limited to this mobile communication system, and is applicable to an LTE (long term evolution) type mobile communication system, for example.

In this case, functions of the above-mentioned radio base station NodeB and the radio network controller RNC are installed to a radio base station eNB or an exchange MME.

Note that operation of the above described mobile station UE, the radio base station NodeB (☐eNB), the exchange MME, and the radio control station RNC may be implemented by means of hardware, a software module executed by a processor, or a combination of both.

The software module may be provided in any type of storage unit medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage unit medium is connected to the processor so that the processor can read and write information from and to the storage unit medium. Also, the storage unit medium may be integrated into the processor. Also, the storage unit medium and the processor may be provided in an ASIC. The ASIC may be provided in the mobile station UE, the radio base station NodeB (eNB), the exchange MSC/SGSN (MME), and the radio control station RNC. Also, the storage unit medium and the processor may be provided in the mobile station UE, the radio base station NodeB (eNB), the exchange MSC/SGSN (MME), the radio control station RNC and the like as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

All content of the Japanese patent application 2008-101989 (Filing date is 9 Apr. 2008) are described into this application by the reference.

As described above, according to the present invention, it is possible to provide a broadcast information reporting method, a mobile station and a certificate authority system which are capable of preventing a "forwarding attack."

The invention claimed is:

1. A broadcast information reporting method for reporting broadcast information to each of a plurality of mobile stations, the method comprising:
   step A of acquiring, by the each of the plurality of mobile stations, location information of the mobile station and managing information related to the acquired location information;
   step B of reporting, to the each of the plurality of mobile stations, broadcast information to which an electronic signature is attached;
   step C of verifying, by the each of the plurality of mobile stations, the broadcast information by use of the electronic signature attached to the received broadcast information;
   step D of when the broadcast information is successfully verified, comparing, by the each of the plurality of mobile stations, location information included in the broadcast information and the location information managed in the mobile station; and
   step E of performing, by the each of the plurality of mobile stations, processing corresponding to the broadcast information depending on the comparison result.

2. The broadcast information reporting method according to claim 1, wherein:
   in the step A, the each of the plurality of mobile stations manages first time information indicating a time when the location information of the mobile station is acquired;
   in the step D, the each of the plurality of mobile stations compares the first time information managed therein and second time information included in the broadcast information; and
   in the step E, the each of the plurality of mobile stations performs processing corresponding to the broadcast information depending on the comparison results on the location information and the time information.

3. The broadcast information reporting method according to claim 1, wherein:
   the location information included in the broadcast information contains a plurality of pieces of area identification information; and
   in the step E, the each of the plurality of mobile stations performs processing corresponding to the broadcast information when the location information managed in the mobile station coincides with at least one of the pieces of area identification information contained in the location information included in the broadcast information.

4. The broadcast information reporting method according to claim 3, wherein the plurality of pieces of area identification information are information identifying areas around an area for which a content of the broadcast information is valid.

5. The broadcast information reporting method according to claim 1, wherein:
   in the step A, the mobile station receives security information corresponding to the location information from a network and manages the security information; and
   in the step C, the each of the plurality of mobile stations verifies the broadcast information by use of the security information and the electronic signature attached to the broadcast information.

6. The broadcast information reporting method according to claim 1, wherein in the step E, the each of the plurality of mobile stations performs processing corresponding to the broadcast information when, as a result of comparison on the time information, it is determined that the second time information is within a predetermined window time of a current time information managed in the mobile station.

7. The broadcast information reporting method according to claim 1, wherein in the step E, the each of the plurality of mobile stations performs processing corresponding to the broadcast information when, as a result of comparison on the time information, it is determined that the second time information indicates a later time than the first time information.

8. A mobile station which performs processing corresponding to broadcast information, comprising:
   a manager configured to acquire location information of the mobile station and to manage information related to the acquired location information;
   a verifier configured to verify the broadcast information by use of an electronic signature attached to the received broadcast information;
   a comparison unit configured to, when the broadcast information is successfully verified, compare location information included in the broadcast information and the location information managed therein; and
   a processor configured to perform processing corresponding to the broadcast information depending on the comparison result,
   wherein:
   the manager is configured to receive security information corresponding to the location information from a network and to manage the security information; and
   the verifier is configured to verify the broadcast information by use of the security information and an electronic signature attached to the broadcast information.

9. A certificate authority system which reports broadcast information to a mobile station in a mobile communication system, the system comprising an emergency information transmitter configured to convert location information included in broadcast information received from an emergency information provider system into area identification information in the mobile communication system, then add, as location information in the broadcast information, area identification information identifying areas around the area identified by the converted area identification information, thereafter assign the broadcast information an electronic signature corresponding to the broadcast information, and report the broadcast information to the mobile station.

* * * * *